United States Patent
Tokiwa et al.

(10) Patent No.: US 9,259,874 B2
(45) Date of Patent: Feb. 16, 2016

(54) POLYCARBONATE RESIN FOAMED BLOW-MOLDED ARTICLE AND PROCESS FOR PRODUCING SAME

(75) Inventors: Tomoo Tokiwa, Tochigi (JP); Masahiro Gomibuchi, Tochigi (JP)

(73) Assignee: JSP Corporation, Tokyo (JP)

( * ) Notice: Subject to any disclaimer, the term of this patent is extended or adjusted under 35 U.S.C. 154(b) by 449 days.

(21) Appl. No.: 13/571,718

(22) Filed: Aug. 10, 2012

(65) Prior Publication Data

US 2012/0308800 A1  Dec. 6, 2012

Related U.S. Application Data

(63) Continuation-in-part of application No. 13/566,334, filed on Aug. 3, 2012.

(30) Foreign Application Priority Data

Apr. 26, 2011  (JP) ................................. 2011-097806

(51) Int. Cl.
| | |
|---|---|
| *B29C 49/04* | (2006.01) |
| *B29C 49/00* | (2006.01) |
| *B29K 69/00* | (2006.01) |
| *B29K 105/04* | (2006.01) |

(52) U.S. Cl.
CPC ............. *B29C 49/04* (2013.01); *B29C 49/0005* (2013.01); *B29K 2069/00* (2013.01); *B29K 2105/04* (2013.01)

(58) Field of Classification Search
None
See application file for complete search history.

(56) References Cited

U.S. PATENT DOCUMENTS

| | | | |
|---|---|---|---|
| 2004/0138381 A1* | 7/2004 | Blasius et al. | 525/131 |
| 2007/0010635 A1* | 1/2007 | Chen et al. | 525/476 |
| 2013/0075944 A1 | 3/2013 | Tokiwa et al. | |

FOREIGN PATENT DOCUMENTS

| | | |
|---|---|---|
| JP | H08-252851 A | 10/1996 |
| JP | H09-309949 A | 12/1997 |
| JP | 2000-033643 A | 2/2000 |
| JP | 2008-144084 A | 6/2008 |
| WO | 2011/161885 A1 | 12/2011 |

OTHER PUBLICATIONS

European Search Report for Application No. EP 12 18 0566, European Patent Office, Oct. 10, 2013.
Decision to Grant a Patent for Application No. 2011-097806, Japan Patent Office, Sep. 16, 2015.

\* cited by examiner

*Primary Examiner* — Monica Huson
(74) *Attorney, Agent, or Firm* — Kubotera & Associates, LLC

(57) ABSTRACT

A process for producing a foamed blow-molded article, including melting and mixing a branched polycarbonate resin having a specific polystyrene equivalent weight average molecular weight, a specific weight average absolute molecular weight and a relatively high terminal hydroxyl group content, a linear polycarbonate resin having specific polystyrene equivalent weight average molecular weight, a specific weight average absolute molecular weight and a relatively low terminal hydroxyl group content and a branching agent to obtain a polycarbonate resin "A", mixing the polycarbonate resin "A" with a blowing agent to obtain a foamable molten resin composition, extruding the foamable molten resin composition to obtain a foamed parison, and blow-molding the foamed parison.

5 Claims, No Drawings

POLYCARBONATE RESIN FOAMED BLOW-MOLDED ARTICLE AND PROCESS FOR PRODUCING SAME

CROSS-REFERENCE TO RELATED APPLICATIONS

This is a continuation-in-part application of a prior application Ser. No. 13/566,334, filed Aug. 3, 2012, pending.

BACKGROUND OF THE INVENTION

1. Field of the Invention

The present invention relates to a process for producing a polycarbonate resin foamed blow-molded article by blow molding a foamed parison, and to a polycarbonate resin foamed blow-molded article.

2. Description of Prior Art

Because a polycarbonate resin (hereinafter occasionally referred to as "PC resin") has much higher melt viscosity at near its foaming temperature and requires an extremely higher extrusion pressure as compared with other resins such as polystyrene, it has been difficult to extrude and foam the PC resin. Moreover, because the melt tension of a PC resin is much smaller than other resins such as polystyrene, cells are apt to be broken during the growth thereof. Therefore, the obtained PC resin extruded foamed product shows only an insufficient expansion ratio and the cells thereof are not uniform in size. In particular, the PC resin foamed blow-molded article has an expansion ratio of as low as about 1.3. It has not been possible to obtain a PC resin foamed blow-molded article having such a high expansion ratio as achieved in the case of a polystyrene or a polyethylene resin.

In this circumstance, Japanese unexamined patent publication No. JP-A-2000-033643 proposes a method in which a PC resin having a branched structure and a specific melt tension is extruded to form a foamed parison. By blow-molding the parison, a PC resin foamed blow-molded article having an acceptable expansion ratio is obtainable.

Japanese unexamined patent publication No. JP-A-2008-144084 proposes a method in which a modified PC resin obtained by modifying a commercially available branched PC resin with a branching agent is extruded through a die with a large area to obtain a foamed board that has a high expansion ratio and a large sectional area and that shows a high compression strength even at both side end regions in the width direction thereof.

SUMMARY OF THE INVENTION

With the method proposed in JP-A-2000-033643, however, it has been found that the closed cell content of the foamed blow-molded article tends to decrease and the wall thickness thereof tends to be non-uniform when an attempt is made to further increase the expansion ratio thereof, further decrease the wall thickness thereof or further reduce the cell size thereof. Thus, there remains a room for further improvement in producing excellent foamed blow-molded articles. It has also been found that the method proposed in JP-A-2008-144084 is not applicable to the production of a foamed blow-molded article. Namely, the modified PC resin has so high a melt viscosity that it is not possible to form a foamed parison suitable for blow molding.

It is an object of the present invention to provide a process for producing a PC resin foamed blow-molded article that has a high closed cell content irrespective of whether its apparent density is high or low (in other words, irrespective of whether its expansion ratio is low or high).

It has been found that the above-described problems can be solved by extruding a foamable molten resin composition containing, as a base resin, a specific PC resin to form a foamed parison and blow-molding the foamed parison. The present invention has been completed based on the above finding.

In accordance with a first aspect of the present invention, there is provided a process for producing a polycarbonate resin foamed blow-molded article, comprising the steps of:

(a) melting and mixing a branched polycarbonate resin "B", a linear polycarbonate resin "C" and a branching agent "D" to obtain a polycarbonate resin "A" in a molten state, wherein the branched polycarbonate resin "B" has a polystyrene equivalent weight average molecular weight $Mw_B(PS)$ of $5.5 \times 10^4$ to $7.0 \times 10^4$, a weight average absolute molecular weight $Mw_B(abs)$ providing a ratio $Mw_B(abs)/Mw_B(PS)$ of the weight average absolute molecular weight $Mw_B(abs)$ to the weight average molecular weight $Mw_B(PS)$ of 0.63 to 0.70 and a content of terminal hydroxyl groups of 500 ppm by mass or more, and the linear polycarbonate resin "C" has a polystyrene equivalent weight average molecular weight $Mw_C(PS)$ of less than $5.0 \times 10^4$, a weight average absolute molecular weight $Mw_C(abs)$ providing a ratio $Mw_C(abs)/Mw_C(PS)$ of the weight average absolute molecular weight $Mw_C(abs)$ to the weight average molecular weight $Mw_C(PS)$ of 0.62 or less and a content of terminal hydroxyl groups of 250 ppm by mass or less, and wherein the branched polycarbonate resin "B" and the linear polycarbonate resin "C" are used in such a proportion as to provide a mass ratio B:C of the branched polycarbonate resin "B" to the linear polycarbonate resin "C" of 30:70 to 95:5, (b) mixing the polycarbonate resin "A" in a molten state with a blowing agent to obtain a foamable molten resin composition, (c) extruding the foamable molten resin composition to obtain a foamed parison, and (d) blow-molding the foamed parison to obtain a foamed blow-molded article.

The above step (b) may be preceded by or simultaneous with the step (a).

In a second aspect, the present invention provides the process according to the above first aspect, wherein the foamed parison has a polystyrene equivalent weight average molecular weight $Mw_F(PS)$ of $5.0 \times 10^4$ to $10 \times 10^4$, and a weight average absolute molecular weight $Mw_F(abs)$ providing a ratio $Mw_F(abs)/Mw_F(PS)$ of the weight average absolute molecular weight $Mw_F(abs)$ to the weight average molecular weight $Mw_F(PS)$ of 1.0 or more. In a third aspect, the present invention provides the process according to the above first or second aspect, wherein the branching agent D is an epoxy-functional acrylic polymer that has a weight average molecular weight of 5,000 to 20,000 and an epoxy value of 1.5 meq/g or more. In a fourth aspect, the present invention provides the process according to the above third aspect, wherein, in step (a), the branching agent D is used in an amount of 0.5 to 4.5 parts by mass per 100 parts by mass of the branched polycarbonate resin "B". In a fifth aspect, the present invention provides the process according to any one of the above first to fourth aspects, wherein the blowing agent is an inorganic physical blowing agent. In a sixth aspect, the present invention provides a polycarbonate resin hollow foamed blow-molded article having a polystyrene equivalent weight average molecular weight $Mw_F(PS)$ of $5.0 \times 10^4$ to $10 \times 10^4$, and a weight average absolute molecular weight $Mw_F(abs)$ providing a ratio $Mw_F(abs)/Mw_F(PS)$ of the weight average absolute molecular weight $Mw_F(abs)$ to the weight average molecular weight $Mw_F(PS)$ of 1.0 or more, said hollow foamed blow-molded article having an apparent density of 0.1 to 0.8 g/cm$^3$, an average thickness of 0.5 to 10 mm and a closed cell content of 60% or more. In a seventh aspect, the present invention provides the polycarbonate resin hollow foamed blow-molded article according to the above sixth aspect, wherein the hollow foamed blow-molded article has a thickness variation coefficient $C_v$ of 50% or less. In an eighth aspect, the present invention provides the polycarbonate resin hollow foamed blow-molded article according to the above sixth or seventh aspect, wherein the hollow foamed blow-molded article has an average cell diameter of 0.1 to 1 mm.

In the process according to the present invention, a foamable molten resin composition containing a specific PC resin "A" and a blowing agent is extruded to obtain a foamed parison in a softened state, which is then blow-molded to obtain a PC resin foamed blow-molded article (hereinafter occasionally referred to as "foamed blow-molded article"). The PC resin "A" is a product obtained by melting and kneading a branched PC resin "B" having a relatively high content of terminal hydroxyl groups, a linear PC resin "C" having a relatively low content of terminal hydroxyl groups and a branching agent D, wherein the PC resins "B" and "C" are present in a specific ratio. By using the specific PC resin "A", improved foamability and blow-moldability can be achieved without any substantial adverse affect on the mechanical strength and formability that are inherent to PC resin. Therefore, it is possible to obtain a foamed blow-molded article that has a high closed cell content, excellent uniformity in the wall thickness and excellent surface appearance throughout a wide range of its apparent density. Thus, the foamed blow-molded article obtained by the process of the present invention has excellent mechanical strengths such as bending strength and impact resistance despite its light weight and also shows excellent heat resistance and cold impact resistance that are inherent to the PC resin and, therefore, may be advantageously used for various applications such as automobile parts, electric or electronic parts and receptacles.

DETAILED DESCRIPTION OF THE PREFERRED EMBODIMENTS OF THE INVENTION

In a preferred embodiment of the process of the present invention, PC resin "A" is melted and kneaded together with a blowing agent in an extruder to form a foamable molten resin composition. The molten resin composition is extruded through a die to obtain a foamed parison in a softened state. The parison is inserted between molds and a compressed gas such as air, called blow air, is blown into the parison to expand the parison so that the outer surface of the parison is pressed against the inside wall of the molds. Thus, the foamed parison is blow-molded to obtain a hollow foamed blow-molded article having a shape conforming to the shape of the mold.

More particularly, the process for producing a polycarbonate resin foamed blow-molded article includes the steps of:

(a) melting and mixing a branched polycarbonate resin "B", a linear polycarbonate resin "C" and a branching agent "D" to obtain a polycarbonate resin "A" in a molten state, (b) mixing the polycarbonate resin "A" in a molten state with a blowing agent to obtain a foamable molten resin composition, (c) extruding the foamable molten resin composition to obtain a foamed parison, and (d) blow-molding the foamed parison to obtain a foamed blow-molded article. Namely, the formable molten resin composition obtained in step (b) contains PC resin "A" that is produced by melting and kneading a branched PC resin "B" having a relatively high content of terminal hydroxyl groups, a linear PC resin "C" having a relatively low content of terminal hydroxyl groups and a low melt viscosity and a branching agent D, wherein PC resins "B" and "C" are present in a specific ratio (step (a)). By extruding the formable molten resin composition (step (c)), it is possible to prevent breakage of cells during foaming and to obtain a foamed parison having a closed cell structure. Further, such a closed cell structure of the foamed parison is maintained throughout the period during which the foamed parison is in a molten state, or until it has been placed between molds. Moreover, the closed cell structure is still maintained during the course of the blow molding (step (d)). Thus, it is possible to obtain a blow-molded article having a high closed cell content even when the apparent density thereof is low and even when the cell size thereof is made smaller than that of the conventional PC resin foamed blow-molded article. Furthermore, the process of the present invention makes it possible to produce a blow-molded article having good surface appearance.

The process of the present invention in which a specific PC resin is used enables the formation of a foamed parison which has improved foamability and blow moldability. The reasons for this are considered as follows. In a foam blow molding process, it is essential to form a foamed parison that is in a good foaming state and capable of being uniformly drawn during the blow molding stage in order to obtain a blow-molded article having a high closed cell content and uniform wall thickness. Formation of a foamed parison requires extrusion of a foamable molten resin composition through a die having a small clearance within a short period of time at a temperature that is suited for foaming. It is, therefore, necessary that such a formable molten resin composition not only shows such fluidity that permits extrusion thereof within a short period of time at a temperature suited for foaming, but also has melt tension sufficient for preventing the cells of the foamed parison from being destroyed throughout the foaming and blow molding stages.

In actual, however, no PC resins have been hitherto known that can give such a formable molten resin composition. For example, as a PC resin having a high melt tension, a branched PC resin in which branches are formed in its polymerization stage is commercially available. By forming a foamed parison using such a PC resin having a specific melt tension, it is possible to obtain a foamed blow-molded article having a relatively high expansion ratio. With this technique, however, it has been found that the closed cell content of the foamed blow-molded article tends to decrease and the wall thickness thereof tends to be non-uniform when an attempt is made to further increase the expansion ratio thereof, further decrease the wall thickness thereof or further reduce the cell size thereof. Thus, there remains a room for further improvement in producing excellent foamed blow-molded articles. As a means for preventing cell breakage during foaming and blow molding stages, a thought may occur to further improve the melt tension of a PC resin by further branching the PC resin. Although a highly branched structure is able to be introduced into a branched PC resin for increasing the melt tension thereof by modifying the branched PC resin with a branching agent, it has been found that such a highly branched PC resin has so high a molecular weight (melt viscosity) that it is difficult to extrude the foamable molten resin composition at a proper foaming temperature. Additionally, when an intermittent extrusion using an accumulator is adopted for foam blow molding, it becomes further difficult to extrude such a highly branched PC resin, because dependency of the melt viscosity thereof upon shear rate is so high that the melt viscosity in a low shear rate (at the time the supply from the accumulator has started) is very high. In this case, although a foamed parison could be formed by increasing the resin temperature above the proper resin temperature, the blow moldability of the obtained foamed parison so poor that the wall thickness of the obtained foamed blow-molded article becomes non-uniform and the surface appearance becomes also deteriorated.

In the process of the present invention, the formable molten resin composition, which contains a blowing agent and a PC resin "A" that is obtained by melting and kneading a branched PC resin "B" having a relatively high content of terminal hydroxyl groups, a linear PC resin "C" having a relatively low content of terminal hydroxyl groups and a low viscosity, and a branching agent D, is extruded to form a foamed parison which is then blow-molded to obtain a foamed blow-molded article having a high closed cell content and good surface appearance.

Although not wishing to be bound by the theory, it is inferred that the improvement in foamability and blow-moldability of PC resin "A" is achieved for the following reasons. Namely, when a branched PC resin "B" having a relatively high content of terminal hydroxyl groups, a linear PC resin "C" having a relatively low content of terminal hydroxyl groups, and a branching agent "D" are melted and mixed together, a PC resin "B" is considered to react with the branching agent "D" so that the PC resin "B" is further branched to form a highly branched PC resin having a reduced free volume and increased dependency of its melt viscosity upon shear rate. The linear PC resin "C" which has a relatively low content of terminal hydroxyl groups, on the other hand, does not or almost does not react with the branching agent "D" and remains as such in the molten kneaded mixture. Thus, it is considered that the PC resin "A" is in the form of a mixture that includes the highly branched PC resin "B" formed by reaction with the branching agent "D" and the linear PC resin "C" having a relatively low viscosity. As a consequence, the mixture (i.e. PC resin "A") not only exhibits a high melt tension, which is attributed to the highly branched PC resin "B", but also has a high fluidity and a low tendency to change its melt viscosity under high and low shear rates, which are attributed to the linear PC resin "C". For this reason, the foamed parison obtained from PC resin "A" is considered to be capable of achieving improvement in foamability and blow-moldability.

As used herein the term "polycarbonate resin" refers to a polyester of carbonic acid and a glycol or a dihydric phenol. The polycarbonate resin is preferably an aromatic polycarbonate resin that is derived from a bisphenol such as 2,2-bis (4-oxyphenyl)propane (Bisphenol A), 2,2-bis(4-oxyphenyl) butane, 1,1-bis(4-oxyphenyl)cyclohexane, 1,1-bis(4-oxyphenyl)isobutane and 1,1-bis(4-oxyphenyl)ethane.

The weight average molecular weight of a PC resin may be determined by gel permeation chromatography (hereinafter referred to as GPC for brevity) using ultraviolet spectrophotometer (UV) as a detector. Such a weight average molecular weight is an equivalent value calibrated using a standard polymer with known molecular weight. When linear polystyrene is used as the standard polymer, the determined weight average molecular weight of the PC resin is a polystyrene equivalent weight average molecular weight (hereinafter occasionally referred to as Mw(PS)). The molecular weight Mw(PS) serves as an index for fluidity of the PC resin in a molten state but does not reflect the real molecular weight thereof. For example, when the PC resin has a branched structure, the Mw(PS) value becomes relatively small. On the other hand, the weight average absolute molecular weight (hereinafter occasionally referred to as Mw(abs)) of a PC resin represents the real molecular weight thereof. Therefore, the higher the branching degree of a PC resin, the greater is the Mw(abs)/Mw(PS) value thereof.

A weight average absolute molecular weight of a polymer may be measured using a detector system including a differential refractometer, a light scattering detector and, if necessary, a viscometer. The light scattering technique utilizes Rayleigh scattering of a solution of the polymer irradiated with a laser light. The intensity of scattered light is measured. The obtained data are plotted (Debye plot). When $KC/R(\theta)$ is plotted on the y-axis and $\sin^2(\theta/2)$ is plotted on the x-axis, a linear relationship is obtained. Here, K represents optical constant, C represents the polymer concentration and $R(\theta)$ represents the relative intensity of the scattered light at scattering angle $\theta$. The weight average absolute molecular weight Mw(abs) is able to be determined from the intercept point on the y-axis. There are three types of light scattering detectors; i.e. low angle laser light scattering detector (LALLS), right angle laser light scattering detector (RALLS) and multi angle laser light scattering detector (MALLS). In the present invention, the weight average absolute molecular weight Mw(abs) is measured by analysis method using GPC coupled with RALLS.

In the present invention, the weight average absolute molecular weight Mw(abs) and polystyrene equivalent weight average molecular weight Mw(PS) may be determined by using the measurement devices and measurement conditions as exemplified below. The polystyrene equivalent weight average molecular weight Mw(PS) is measured using a UV spectrophotometer detector, while the weight average absolute molecular weight Mw(abs) is measured by using a triple detector system composed of a differential refractive index detector, RALLS and a differential pressure viscometer detector.

GPC device:
   GPC mode high speed liquid chromatograph (manufactured by GL Sciences Inc.);

Column:
   Shodex GPC columns KF-806, KF-805 and KF803 (manufactured by Showa Denko Co., Ltd.) connected in series in this order;

Detectors:
   UV (UV spectrophotometer): UV702 (manufactured by GL Sciences Inc.)
   RI (Differential refractive index detector): Shodex RI-101 (Showa Denko K. K.)
   Visc (Differential pressure viscometer detector)
   RALLS (90° Laser Light scattering detector): TDA Moel 270 (manufactured by Viscotek Corp.)

Conditions:
   Mobile phase: Tetrahydrofuran (flow rate: 1.0 mL/min)
   Sample concentration: about 1.5 mg/cm$^3$
   Sample injection volume: 200 μL
   Column Temperature: 40° C.
   RI thermostat-controlled temperature: 40° C.
   UV measured wavelength: 254 nm
   RALLS light source wavelength: 670 nm The branched PC resin "B" must have a polystyrene equivalent weight average molecular weight $Mw_B(PS)$ of $5.5 \times 10^4$ to $7.0 \times 10^4$. When $Mw_B(PS)$ is within the above range, the weight average molecular weight of the molten PC resin "A" to be extruded falls within the range that is suitable for foam blow molding while the branching degree of thereof is maintained in a high degree. From this point of view, the molecular weight $Mw_B(PS)$ is preferably $5.5 \times 10^4$ to $6.8 \times 10^4$, more preferably $5.5 \times 10^4$ to $6.5 \times 10^4$.

The branched PC resin "B" must also have a ratio $Mw_B$(abs)/$Mw_B$(PS) of 0.63 to 0.70, where $Mw_B$(abs) represents a weight average absolute molecular weight of the branched PC resin "B" and $Mw_B$(PS) is as defined above, in order to achieve the objects of the present invention. The higher the $Mw_B$(abs)/$Mw_B$(PS) ratio (this ratio will be hereinafter occasionally referred to as "branching degree B"), the greater is the number of branches of the PC resin "B". The branching degree B is preferably 0.65 or more.

It is important that the linear PC resin "C" should have a polystyrene equivalent weight average molecular weight $Mw_C$(PS) of less than $5.0 \times 10^4$ in order to produce a foamed blow-molded article having a high closed cell content and a good appearance. By incorporating the linear PC resin "C" in the PC resin "A", it is possible to reduce the melt viscosity of the PC resin "A" and to decrease a melt viscosity change thereof under high and low shear rates, while maintaining its excellent foamability attributed to the PC resin "B" that is modified by the branching agent "D". The high closed cell content of the obtained foamed blow-molded article is considered to be achieved for this reason. From this point of view, the molecular weight $Mw_C$(PS) is preferably $3.0 \times 10^4$ to $4.5 \times 10^4$, more preferably $3.0 \times 10^4$ to $4.0 \times 10^4$.

It is also important that the linear PC resin "C" should have a ratio $Mw_C$(abs)/$Mw_C$(PS) of 0.62 or less, where $Mw_C$(abs) is a weight average absolute molecular weight of the linear PC resin "C" and $Mw_C$(PS) is as defined above, in order to achieve the objects of the present invention. The smaller the $Mw_C$(abs)/$Mw_C$(PS) ratio (this ratio will be hereinafter occasionally referred to as "branching degree C"), the more preferred. The branching degree C. is preferably 0.60 or less, more preferably 0.58 or less. The lower limit of the branching degree C. is about 0.50.

The branched PC resin "B" must have a content of terminal hydroxyl groups of 500 ppm by mass or more in order to produce a good foamed blow-molded article. Since terminal hydroxyl groups of an ordinary PC resin are end-capped with an end-capping agent in order to prevent decomposition thereof during processing, the terminal hydroxyl group content thereof is low. In the present invention, the branched PC resin "B" is converted into a highly branched state by reaction with the branching agent "D" during their melting and mixing (during step (a) and also possibly during step (b)), as described previously. To attain this purpose, it is necessary that the branched PC resin "B" contain a significant amount of hydroxyl groups. When the branched PC resin "B" has a content of terminal hydroxyl groups of 500 ppm by mass or more, it is possible to further increase the branching degree thereof by modification with the branching agent "D". The terminal hydroxyl group content of the branched PC resin "B" is preferably 650 ppm by mass or more, more preferably 800 ppm by mass or more. Since too high a terminal hydroxyl group content may cause decomposition of the branched PC resin "B" during melting and kneading in an extruder, it is preferred that the upper limit of the terminal hydroxyl group content be 2,000 ppm by mass.

The linear PC resin "C" must have a content of terminal hydroxyl groups of 250 ppm by mass or less in order to achieve the object of the present invention. It is considered that because such a linear PC resin "C" having a low content of terminal hydroxyl groups is not or almost not modified with the branching agent "D" and is not or almost not bonded to the branched PC resin "B", the PC resin "A" can exhibit low dependency of its melt viscosity upon shear rate. From this point of view, the content of terminal hydroxyl groups of the linear PC resin "C" is preferably 150 ppm by mass or less, more preferably 100 ppm by mass or less. The lower limit of the terminal hydroxyl group content is 0 ppm by mass.

As used herein, the terminal hydroxyl group content of a PC resin refers to amount of terminal hydroxyl groups as measured by colorimetric determination using a titanium tetrachloride/acetic acid method (Macromol. Chem., vol. 88, p 215 (1965)) and is expressed in terms of ppm by mass of the terminal hydroxyl groups based on the mass of the PC resin.

As used herein, the term branching agent "D" is intended to refer to a compound having a plurality of functional groups, such as epoxy groups and carboxyl groups, that can react with hydroxyl groups of a PC resin. Examples of the branching agent "D" include acrylic polymers having a plurality of functional epoxy groups; and carboxylic acid compounds (such as carboxylic acids, carboxylic anhydrides and carboxylic esters) having 3 or more functionalities. The acrylic polymer is preferably a copolymer of an epoxy group-containing acrylic monomer with a copolymerizable monomer having no epoxy group. The epoxy group-containing acrylic monomer may be, for example, glycidyl methacrylate. The copolymerizable monomer having no epoxy group may be, for example, (1) a copolymerizable monomer other than acrylic monomer, such as styrene, (2) an acrylic monomer having no epoxy group, such as butyl acrylate and methyl methacrylate, or (3) a mixture of the above monomers (1) and (2).

Specific examples of the branching agent "D" include an epoxy-functional acrylic polymer having a weight average molecular weight of 5,000 to 20,000 and an epoxy value of 1.5 meq/g or more. Specific examples of the carboxylic acid compounds having 3 or more functionalities include 1,2,4-benzenetricarboxylic acid (trimellitic acid), trimethyl 1,2,4-benzenetricarboxylate, 1,2,4-benzenetricarboxylic anhydride (trimellitic anhydride), 1,3,5-benzenetricarboxylic acid, 1,2,4,5-benzenetetracarboxylic acid (pyromellitic acid), 1,2,4,5-benzenetetracarboxylic dianhydride (pyromellitic dianhydride), 3,3',4,4'-benzophenonetetracarboxylic dianhydride, 1,4,5,8-naphthalenetetracarboxylic dianhydride and mixtures thereof.

The amount of the branching agent "D" to be admixed with the PC resins "B" and "C" cannot be specifically defined, since it is dependent upon the kind of the PC resins "B" and "C", blending ratio between them and kind of the branching agent (reactivity of the branching agent varies with the kind and number of its functional groups). When an epoxy-functional acrylic polymer having a weight average molecular weight of 5,000 to 20,000 and an epoxy value of 1.5 meq/g or more is used as the branching agent "D", it is preferable to use the branching agent "D" in an amount of 0.5 to 4.5 parts by mass per 100 parts by mass of the branched PC resin "B". The "weight average molecular weight" of the epoxy-functional acrylic polymer as used herein refers to polystyrene equivalent weight average molecular weight as measured by the above-described method used for the measurement of the PC resins.

It is preferred that the foamed parison obtained in step (c) have a polystyrene equivalent weight average molecular weight $Mw_P$(PS) of $5.0 \times 10^4$ to $10 \times 10^4$, and a weight average absolute molecular weight $Mw_P$(abs) providing a ratio $Mw_P$(abs)/$Mw_P$(PS) (this ratio will be hereinafter occasionally referred to as "branching degree P") of the weight average absolute molecular weight $Mw_P$(abs) to the weight average molecular weight $Mw_P$(PS) of 1.0 or more (namely, very high branching degree P) for reasons of obtaining extremely excellent foamed blow-molded article. When the foamed parison has the above-mentioned specific molecular weight $Mw_P$(PS) and high branching degree P, the foamed blow-molded article obtained therefrom has especially high closed cell content and good appearance. From this point of view, the molecular weight $Mw_P(PS)$ is more preferably $5.0×10^4$ to $9.0×10^4$, still more preferably $5.0×10^4$ to $8.5×10^4$. In this connection, it is to be noted that the mere fact that a foamed parison has a molecular weight $Mw_P(PS)$ of $5.0×10^4$ to $10×10^4$ and a branching degree P of 1.0 or more does not indicate that the foamed parison shows good foamability. It is also important that the foamed parison should be obtained from the PC resins "B" and "C" and branching agent "D" as described above.

Incidentally, it is not possible to directly measure the polystyrene equivalent weight average molecular weight $Mw_A(PS)$ and branching degree A of the PC resin "A" contained in the molten foamable resin composition which is being extruded through a die. However, the $Mw_A(PS)$ and the branching degree A of the PC resin "A" in the molten foamable resin composition are generally the same as $Mw_P(PS)$ and the branching degree P of a foamed parison obtained therefrom and also the same as hereinafter described $Mw_F(PS)$ and branching degree F. of the foamed blow-molded article obtained from the foamed parison. Thus, it is preferred that the blow-molded article have a polystyrene equivalent weight average molecular weight $Mw_F(PS)$ of $5.0×10^4$ to $10×10^4$, and a weight average absolute molecular weight $Mw_F(abs)$ providing a ratio $Mw_F(abs)/Mw_F(PS)$ (this ratio will be hereinafter occasionally referred to as "branching degree F.") of the weight average absolute molecular weight $Mw_F(abs)$ to the weight average molecular weight $Mw_F(PS)$ of 1.0 or more (namely, very high branching degree F.) for reasons of obtaining extremely excellent foamed blow-molded article. The foamed blow-molded article, which has the above-mentioned specific molecular weight $Mw_F(PS)$ and high branching degree F., exhibits especially high closed cell content and good appearance. From this point of view, the molecular weight $Mw_F(PS)$ is more preferably $5.0×10^4$ to $9.0×10^4$, still more preferably $5.0×10^4$ to $8.5×10^4$. In this connection, it is to be noted that the mere fact that a foamed blow-molded article has a molecular weight $Mw_F(PS)$ of $5.0×10^4$ to $10×10^4$ and a branching degree F. of 1.0 or more does not indicate that the article shows good closed cell content and good appearance. It is also important that the foamed blow-molded article should be obtained from the PC resins "B" and "C" and branching agent "D" as described above.

It is also preferred that the foamed blow-molded article show a Mark-Houwink plot in which the slope S in a high molecular weight region is 0.50 or less. As used herein, "Mark-Houwink plot" refers to a double-logarithmic plot of intrinsic viscosity (ordinate) against absolute molecular weight (abscissa) determined by analysis with a GPC-RALLS-visometer system. In this plot, log(molecular weight) versus log(intrinsic viscosity) shows a linear relationship for linear polymers. In the case of branched polymers, the slope changes and becomes gentle on a high molecular weight region. It is possible to evaluate the presence of branches in a given polymer from a change of the slope. Namely, the smaller the slope, the greater is the number of branches contained in the polymer. In the case of a PC resin, a change in the slope occurs at a point in a molecular weight region of between $1.5×10^4$ and $20×10^4$, although the point varies with the average molecular weight of the PC resin. The above-described slope S in a high molecular weight region is the slope of the linear region of the plot after the slope change. The smaller the slope S, the greater is the amount of branches and the better is the foamability of the resin and, consequently, the better is the obtained foamed blow-molded article. From this point of view, the slope S is more preferably 0.45 or less, still more preferably 0.40 or less. Incidentally, linear PC resins generally show a slope S of about 0.7, while commercially available branched PC resins show a slope S of about 0.6.

The PC resin "A" is obtainable by melting and mixing the branched PC resin "B", linear PC resin "C" and branching agent "D" (step a). A method for mixing the branched PC resin "B", linear PC resin "C" and branching agent "D" is not specifically limited. For example, the PC resins "B" and "C" and branching agent "D" may be first melted and kneaded to obtain a mixture (this may be hereinafter occasionally referred to as "PC resin "X""). The PC resin "X" may be then fed to an extruder of a blow molding device as such or after having been further mixed with at least one of the PC resins "B" and "C" and branching agent "D". Alternatively, the PC resins "B" and "C" and branching agent "D" may be dry-blended together and the resulting blend may be fed to an extruder of a blow molding device. In a further method, the PC resin "B" and branching agent "D" may be first melted and mixed to obtain a modified PC Resin "B". The modified PC Resin "B" thus obtained may be then dry-blended with the PC resin "C" and the blend may be fed to an extruder of a blow molding device. In a further alternate method, the PC resin "C" and branching agent "D" may be first melted and mixed. The resulting mixture may be dry-blended with the PC Resin "B", and the may be fed to an extruder of a blow molding device. In any of the foregoing methods, the PC resin X may be additionally added in any desired step. It is preferred that the step (a) be performed at a temperature of about 250 to 320° C., more preferably about 260 to 300° C. for about 3 to 30 minutes, more preferably about 5 to 25 minutes.

In blow molding, since a parison is sandwiched between molds, a parting line is generally formed on a periphery of the molded article as a result of cutting by the molds. Protruding fins which are formed along the parting line are removed. The fins which are produced in a large amount may be collected and repelletized for recycling. Such fins when produced in the blow molding process of the present invention may be suitably used again as a raw material PC resin, since the collected fins are formed of the PC resin "A" produced from the branched PC resin "B", linear PC resin "C" and the branching agent "D".

In the process of the present invention, a mass ratio B:C of the branched polycarbonate resin "B" to the linear polycarbonate resin "C" should be 30:70 to 95:5. When the proportion of the linear polycarbonate resin "C" is excessively small (namely when B:C ratio is greater than 95:5), it is not possible to obtain sufficient foamability improving effect. When proportion of the linear polycarbonate resin "C" is excessively large (namely when B:C ratio is smaller than 30:70), it is necessary to use a large amount of the branching agent "D" and to increase the branching degree of the branched polycarbonate resin "B", since otherwise the foamability improving effect is not obtainable. However, this results in an excessive increase of the molecular weight of the branched polycarbonate resin "B" and in deterioration of the miscibility between the highly branched polycarbonate resin "B" and the linear polycarbonate resin "C". Thus, the use of an excessively large amount cannot achieve the foamability improving effect. From these view points, the mass ratio B:C of the branched polycarbonate resin "B" to the linear polycarbonate resin "C" is preferably 40:60 to 90:10, more preferably 50:50 to 80:20.

The melt viscosity and melt tension of the foamed blow-molded article (the base resin that constitutes the foam of the foamed blow-molded article), which are the same as those of the PC resin "A" at the time it is extruded through a die for the formation of a foamed parison, will be next described. The foamed blow-molded article preferably has a melt viscosity of $1.5 \times 10^3$ to $1.0 \times 10^4$ Pa·s, more preferably $1.5 \times 10^3$ to $8.0 \times 10^3$ Pa·s, at 250° C. and at a shear rate of 100 sec$^{-4}$, for reasons that excessive shear heat generation during extrusion of the foamed parison from which the foamed blow-molded article is made can be suppressed, excessive draw down of the foamed parison can be prevented and, therefore, a foamed blow-molded article having high thickness accuracy and high closed cell content is easily obtainable.

The "melt viscosity" refers to viscosity as measured for fully dried PC resin sample (water content: 100 ppm by mass or less) using an orifice having an inner diameter of 1 mm and a length of 10 mm. The measurement may be carried out using a measuring apparatus "CAPILOGRAPH 1D" (manufactured by Toyo Seiki Srisaku-sho Ltd.).

The foamed blow-molded article preferably has a melt tension of 15 cN or higher, more preferably 17 cN or higher, at 250° C. for reasons that breakage of cells during foaming and blow molding stages can be effectively prevented. The upper limit of the melt tension is about 50 cN.

As used herein the term "melt tension" refers to melt tension as measured by the following method. A cylinder having a cylinder diameter of 9.55 mm and a length of 350 mm and an orifice having a nozzle diameter of 2.095 mm and a length of 8.0 mm are used. With the cylinder and the orifice set at a temperature of 230° C., a PC resin sample is charged in a required amount in the cylinder and held therein for 4 minutes. The molten resin is then extruded in the form of a string through the orifice at a piston speed of 10 mm/minute. The extruded string is put on a tension-detecting pulley having a diameter of 45 mm and is taken up on a roller while increasing the take-up speed at a constant take-up acceleration rate such that the take-up speed increases from 0 m/minute to 200 m/minute through a period of 4 minutes. At this time, the maximum tension (cN) immediately before the string breaks is measured. When the resin string does not break up to the take-up speed of 200 m/minute, then the melt tension (cN) is as measured by the take-up operation at a constant take-up speed of 200 m/minute. It is to be noted that the above measurement should be carried out such that inclusion of air bubbles in the string is prevented as much as possible at the time of extrusion of the molten resin in the string form through the orifice.

In one preferred embodiment of the process of the present invention, the PC resins "A" thus prepared is fed to an extruder of a blow molding device, where it is admixed with a blowing agent to obtain a foamable molten resin composition. The foamable molten resin composition is then extruded through a die attached to the extruder to obtain a foamed parison in a softened state. The foamed parison is inserted between molds and blow-molded to obtain a foamed blow-molded article.

The blowing agent to be incorporated into the foamable molten resin composition may be a physical blowing agent, a chemical blowing agent or a mixture of these blowing agents. Examples of the physical blowing agent include aliphatic hydrocarbons such as propane, n-butane, isobutane, n-pentane, isopentane, n-hexane and isohexane; alicyclic hydrocarbons such as cyclobutane, cyclopentane and cyclohexane; halogenated hydrocarbons such as methyl chloride, ethyl chloride, 1,1,1,2-tetrafluoroethane and 1,1-difluoroethane; alcohols such as ethanol and methanol; ethers such as dimethyl ether, diethyl ether and methyl ethyl ether; inorganic physical blowing agents such as carbon dioxide, nitrogen and argon. Examples of the chemical blowing agent include azodicarbonamide, sodium bicarbonate and a mixture of sodium bicarbonate with citric acid. These blowing agents may used singly or in combination of two or more thereof.

Among the above blowing agents, the use of a physical blowing agent is preferred. It is more preferred that a physical blowing agent contain 50 to 100 mol % of carbon dioxide (the blowing agent may consist only of carbon dioxide) because of reduced cycle time required for completing one molding cycle and improved dimensional stability of the hollow foamed blow-molded article. It is particularly preferred that the blowing agent be composed only of a physical blowing agent such as carbon dioxide. A cell controlling agent such as talc may be added to the PC resin "A". The above-described chemical blowing agent may also used as the cell controlling agent. The cell controlling agent is generally used in the form of a master batch. The cell controlling agent is used in an amount of 0.05 to 10 parts by weight per 100 parts by weight of the PC resin "A". If desired, one or more additives such as a flame retardant, a fluidity improver, a UV absorbing agent, an electrical conductivity imparting agent, a colorant, a thermal stabilizer, an antioxidant and an inorganic filler may be also suitably added to the PC resin "A".

In the process for producing a foamed blow-molded article of the present invention, the apparent density, closed cell content and other properties may be mainly controlled by adjustment of the using amount of the physical blowing agent. Such properties may also be controlled by adjustment of the discharge rate and the resin temperature at the time the foamable molten resin composition is extruded through a die. Namely, as the amount of the physical blowing agent increases, the average apparent density of the foamed blow-molded article tends to decrease. The amount of the physical blowing agent is generally properly determined in consideration of the desired expansion ratio and the kind of the blowing agent. When carbon dioxide is used as the blowing agent, for example, the amount thereof is preferably 0.1 to 1 mole per 1 kg of the PC resin "A" in order to obtain a foamed blow-molded article having an apparent density of 0.1 to 0.8 g/cm$^3$. The apparent density of the foamed blow-molded article generally decreases with an increase of the discharge rate or an increase of the resin temperature, even when the amount of the blowing agent is held constant.

When the discharge rate is excessively high, however, cells of the foamed parison are apt to open due to shear heat generation. On the other hand, too slow a discharge rate will cause premature foaming in the die and, hence, will result in formation of open cells. Even when such premature foaming does not occur, there is still a possibility that the resin may solidify during extrusion so that open cells are formed during the blow molding stage. Thus, the discharge rate is generally 10 to 100 kg/h·cm$^2$.

When the resin temperature at the time the foamable molten resin composition is extruded through a die is excessively high, problems such as formation of open cells, deterioration of blow moldability and phenomenon of draw down tend to occur in the foamed parison. From this point of view, the resin temperature at the time of extrusion of the parison is generally about 205 to 240° C., particularly preferably 210 to 230° C.

The foamed blow-molded article produced in the process of the present invention preferably has an apparent density of 0.1 to 0.8 g/cm$^3$ and an average wall thickness of 0.5 to 10 mm. When the apparent density and average wall thickness of the foamed blow-molded article are within the above ranges, the article shows a good balance between the mechanical property (e.g., bending strength and compressive strength), lightness in weight and heat insulation property. From this point of view, the apparent density is more preferably 0.12 to 0.6 g/cm³, still more preferably 0.15 to 0.4 g/cm³, while the average wall thickness is more preferably 1 to 8 mm, still more preferably 2 to 6 mm. As used herein, "apparent density" of the foamed blow-molded article refers to values calculated by dividing the weight (g) of the foamed blow-molded article sample by the volume (cm³) thereof which is measured by, for example, immersing the sample in water.

The term "average wall thickness" of the foamed blow-molded article as used herein refers to thickness as measured by the following method. The blow-molded article is cut by a plane perpendicular to an axial (longitudinal) direction thereof at seven (7) positions including a first position near one end thereof, a second position near the other end thereof, and five positions which divide the length between the first and second positions into six nearly equal lengths. Each of the cross-sections thus obtained in the seven different positions is measured for the wall thickness at eight (8) locations which are nearly equally spaced from each other along the perimeter thereof. The average wall thickness is the arithmetic mean of the fifty six (56) measured thickness values. In measuring the wall thickness, each of the cross sections is enlarged using a microscope or the like. On the enlarged image, the wall thickness (length in the thickness direction) is measured at average thickness locations. The wall thickness is calculated by dividing the measured value by the magnification of the enlarged image.

It is preferred that the foamed blow-molded article have a variation coefficient Cv of its wall thickness of 50% or less. A small variation coefficient Cv means that the foamed blow-molded article has uniform wall thickness. When the wall thickness of the foamed blow-molded article is not uniform, such an article has thin walled portions that have relatively weak mechanical strength. In designing a foamed blow-molded article which satisfies the desired strength and heat insulation property, it is generally necessary to determine the average thickness thereof with due consideration of thin walled portions thereof. Therefore, when the wall thickness of the foamed blow-molded article is not uniform, the average wall thickness must be increased so that it becomes difficult to sufficiently achieve a reduction of the weight thereof. Thus, a foamed blow-molded article that has a small variation coefficient Cv is excellent in uniformity of mechanical strength and heat insulation property, and, therefore, is able to achieve a reduction of the weight thereof. For the above reasons, the variation coefficient Cv of the foamed blow-molded article is desired to be as small as possible. In particular, the variation coefficient Cv is more preferably 40% or less, even more preferably 30% or less, still more preferably 25% or less, particularly preferably 20% or less. The process of the present invention enables to produce foamed blow-molded articles having excellent uniformity in wall thickness over a wide range of its apparent density.

The term "variation coefficient Cv" of the wall thickness of the foamed blow-molded article as used herein is defined by the percentage of the standard variation V (mm) of the thickness of the foamed blow-molded article relative to the average thickness T (mm) thereof and represents a degree of variation from the average value. The standard variation V of the thickness of the foamed blow-molded article is calculated according to the following formula (1):

$$V = \{\Sigma(T_i - T_{av})^2/(n-1)\}^{1/2} \quad (1)$$

wherein $T_i$ is a measured thickness value of each of the above-described 56 locations, $T_{av}$ is the above-described average thickness, n is the number of the measurement (namely, 56) and $\Sigma$ means a sum of $(T_i - T_{av})^2$ calculated for respective measured values. Thus, the variation coefficient Cv can be determined from the following formula (2):

$$Cv(\%) = (V/T_{av}) \times 100 \quad (2)$$

The foamed blow-molded article produced by the process of the present invention preferably has a closed cell content of 60% or more, more preferably 70% or more, particularly preferably 80% or more. When the closed cell content is within the above range, excellent mechanical strength such as bending strength and compressive strength that is inherent to the PC resin may be attained even when the foamed blow-molded article is rendered to be light weight by increasing its expansion ratio and by reducing its wall thickness.

As used herein, the closed cell content (%) refers to values calculated by the formula (3) below upon determining the true volume $V_x$ according to Procedure C of ASTM D-2856-70 (reapproved 1976). In this case, when the required volume cannot be obtained from one sample, two or more samples may be combined together to get as close the required volume as possible.

$$\text{Closed cell content } (\%) = (V_x - V_a(\rho_f/\rho_s)) \times 100/(V_a - V_a(\rho_f/\rho_s)) \quad (3)$$

wherein $V_x$ represents a true volume (cm³) of the specimen, which corresponds to a sum of a volume of the resin constituting the specimen and a total volume of closed cells in the specimen, $V_a$ represents the apparent volume (cm³) of the specimen which is calculated from the outer dimension thereof, $\rho_f$ represents the apparent density (g/cm³) of the specimen, and $\rho_s$ represents the density (g/cm³) of the base resin constituting the specimen.

The foamed blow-molded article produced by the process of the present invention preferably has an average cell diameter of 0.1 to 1 mm, more preferably 0.1 to 0.8 mm. The foamed blow-molded article, which has an average cell diameter within the above range, can sufficiently exhibit the excellent mechanical strength such as bending strength and compressive strength that is inherent to the PC resin. As used herein, the "average cell diameter" of the foamed blow-molded article refers to mean cell diameter as measured in accordance with ASTM D3576-77. More specifically, a cross-section of the foamed molded article is magnified and projected. A straight line is drawn on the projected image. The number of cells that intersect this line is counted. The value computed by dividing the length of the straight line by the count of the number of cells is further divided by 0.616 to obtain an average cell diameter. Such a measurement is carried out for determining the average cell diameter in each of the extrusion direction (generally longitudinal direction), peripheral direction and thickness direction of the foamed blow-molded article. The arithmetic mean of the average cell diameters in these three directions represents the average cell diameter of the foamed blow-molded article.

The process of the present invention enables to easily produce foamed blow-molded articles having a high closed cell content over a wide range of its apparent density. With the conventional processes, it has been difficult to produce a foamed blow-molded article having a high closed cell content and a high expansion ratio (for example, an apparent density of less than 0.2 g/cm³). With the process of the present invention, on the other hand, it is possible to produce a foamed blow-molded article having a closed cell content of 60% or higher and a low apparent density of less than 0.2 g/cm³. Further, with the conventional process, a reduction of the average cell diameter causes an increase of the open cell structure because of excessive reduction of the cell wall thickness. In contrast, the process of the present invention makes it possible to produce a foamed blow-molded article having a closed cell content of 60% or higher over a wide range of its apparent density, even when the average cell diameter is as small as 0.1 to 1 mm.

EXAMPLES

The following examples and comparative examples will further illustrate the present invention. Raw materials used in the examples and comparative examples and methods for evaluating the foamed blow-molded articles obtained in the examples and comparative examples are first described below.

(1) Raw Materials
(i) PC resin

Tables 1 and 2 show 6 types of raw material PC resins used (PC1, PC2 and PC4 to PC7). PC1 is a branched PC resin (NOVAREX M7027BF manufactured by Mitsubishi Engineering-Plastics Corporation). PC2 is a branched PC resin (TARFLON IB2500 manufactured by Idemitsu Kosan Co., Ltd.). PC4 to PC7 are linear PC resins (IUPILON H-4000, IUPILON H-3000, IUPILON S-3000 and IUPILON E-2000, respectively, manufactured by Mitsubishi Engineering-Plastics Corporation). Also used were 4 types of raw material PC resins (PC11, PC12, PC21 and PC22) shown in Table 3, in which PC 11 is a PC resin recycled from Example 1 and PC 12 is a PC resin recycled from Example 3. PC 21 is a PC resin obtained by melting and kneading a mixture of PC1 and a branching agent (described hereinafter) with a mixing ratio (by mass) of PC1 to the branching agent of 100:2.1 using a twin screw extruder set at 280° C., and pelletizing the kneaded mixture. PC22 is a PC resin obtained by melting and kneading a mixture of PC1 and a branching agent (described hereinafter) with a mixing ratio (by mass) of PC1 to the branching agent of 100:3.0 using a twin screw extruder set at 280° C., and pelletizing the kneaded mixture. The terminal hydroxyl group content (ppm by mass) shown in Tables 1 to 3 is as determined by arbitrarily sampling three specimens from the pellets of the raw material PC resin and measuring the terminal hydroxyl group content of each of the specimens according to the method described previously. The arithmetic mean of the terminal hydroxyl group contents of the three samples is the terminal hydroxyl group content of the raw material PC resin. The slope S shown in Tables 1 to 3 is the slope of the hereinafter described Mark-Houwink plot.

TABLE 1

| PC Resin | Mw(abs) × $10^4$ | Mw(PS) × $10^4$ | Mw(abs)/ Mw(PS) | Slope S | Terminal hydroxyl group content (ppm by mass) |
|---|---|---|---|---|---|
| PC1 | 3.9 | 5.9 | 0.66 | 0.58 | 1,000 |
| PC2 | 3.7 | 5.7 | 0.65 | 0.61 | 80 |

TABLE 2

| PC Resin | Mw(abs) × $10^4$ | Mw(PS) × $10^4$ | Mw(abs)/ Mw(PS) | Slope S | Terminal hydroxyl group content (ppm by mass) |
|---|---|---|---|---|---|
| PC4 | 2.0 | 3.6 | 0.56 | 0.70 | 200 |
| PC5 | 2.1 | 3.7 | 0.57 | 0.68 | 80 |
| PC6 | 2.7 | 4.9 | 0.55 | 0.67 | 150 |
| PC7 | 3.4 | 5.6 | 0.61 | 0.68 | 150 |

TABLE 3

| PC Resin | Mw(abs) × $10^4$ | Mw(PS) × $10^4$ | Mw(abs)/ Mw(PS) | Slope S | Terminal hydroxyl group content (ppm by mass) |
|---|---|---|---|---|---|
| PC11 | 15 | 6.5 | 2.3 | 0.44 | 700 |
| PC12 | 15 | 6.7 | 2.3 | 0.41 | 700 |
| PC21 | 7.9 | 6.7 | 1.2 | 0.42 | 800 |
| PC22 | 11 | 6.9 | 1.5 | 0.38 | 800 |

(ii) Branching Agent

As a branching agent, an acrylic polymer having epoxy groups (ARUFON UG-4035 manufactured by Toagosei Co., Ltd.; epoxy value: 1.8 meq/g; weight average molecular weight: 11,000) was used. The epoxy value (meq/g) is the millimole number of the epoxy group per 1 g of the branching agent and is equal to the number obtained by dividing 1000 by the epoxy equivalent (g/eq) of the branching agent. The epoxy equivalent was measured according to JIS K7236:2001.

(iii) Cell Controlling Agent

Talc (HI-FILLER #12 manufactured by Matsumura Sangyo Co., Ltd.) was used as a cell controlling agent.

(2) Evaluation Methods of Foamed Blow-Molded Articles:
(i) Weight Average Absolute Molecular Weight, Polystyrene Equivalent Weight Average Molecular Weight and Slope S in Mark-Houwin Plot According to the measuring methods described previously, the weight average absolute molecular weight, polystyrene equivalent weight average molecular weight and slope S of foamed blow-molded articles were measured. These weight average molecular weights were determined using an analysis software EzChromElite (Scientific Software Inc.). The polystyrene equivalent weight average molecular weight was determined by gel permeation chromatography using UV (ultraviolet spectrophotometer) as a detector. The polystyrene equivalent weight average molecular weight is a polystyrene equivalent value obtained from a calibration curve prepared using linear polystyrene as a standard polymer. In the measurement of the weight average absolute molecular weight and polystyrene equivalent weight average molecular weight of a foamed blow-molded article, three specimens were sampled from the blow-molded article at three positions, i.e. near both end portions and middle portion in the longitudinal (extrusion) direction of the article. The arithmetic mean of the measured values of the three specimens represents the weight average absolute molecular weight and polystyrene equivalent weight average molecular weight of the foamed blow-molded article. In Tables 6-1 and 7-1, described hereinafter, the weight average absolute molecular weight and polystyrene equivalent weight average molecular weight of the foamed blow-molded article are indicated as Mw(abs) and Mw(PS), respectively. A foamed parison which had not yet been subjected to blow molding was sampled and measured for its Mw(abs) and Mw(PS). It was revealed that Mw(abs) and Mw(PS) of the foamed parison are the same as Mw(abs) and Mw(PS), respectively, of the foamed blow-molded article which was obtained from the similar foamed parison. Incidentally, the above-described method for the measurement of the weight average absolute molecular weight and polystyrene equivalent weight average molecular weight of a foamed blow-molded article also applies to that of raw material PC resins. In the case of raw material PC resins, three specimens are arbitrarily sampled from the pellets of a raw material PC resin. The arithmetic mean of the measured values of the three specimens represents the weight average absolute molecular weight and polystyrene equivalent weight average molecular weight of the raw material PC resins and are shown in Tables 1 to 3. In Tables 1 to 3, the weight average absolute molecular weight and polystyrene equivalent weight average molecular weight of the raw material PC resin are indicated as Mw(abs) and Mw(PS), respectively.

(ii) Melt Tension and Melt Viscosity

The melt tension and melt viscosity of foamed blow-molded articles were measured by the method described previously using "CAPILOGRAPH 1D" (manufactured by Toyo Seiki Seisaku-sho Ltd.). Specimens were measured after having been dried in a recirculation type hot air oven at 120° C. for 12 hours. In the measurement of the melt tension and melt viscosity of a foamed blow-molded article, three specimens were sampled from the blow-molded article at three positions, i.e. near both end portions and middle portion in the longitudinal (extrusion) direction of the article. Each of the specimens was dried in a recirculation type hot air oven at 120° C. for 12 hours, heat-pressed at 10 MPa for defoaming, cut into a suitable size and then measured for the melt tension and melt viscosity. The arithmetic mean of the measured values of the three specimens represents the melt tension and melt viscosity of the foamed blow-molded article.

(iii) Apparent Density

The apparent density of a foamed blow-molded article was calculated by dividing the weight (g) of the foamed blow-molded article by the volume (cm$^3$) thereof which is measured by immersing the foamed blow-molded article in water.

(iv) Average Wall Thickness and Variation Coefficient of Wall Thickness Cv.

The average wall thickness and variation coefficient of wall thickness Vc were measured by the method described previously.

(v) Average Cell Diameter

In the measurement of the average cell diameter of a foamed blow-molded article, three specimens were sampled from the blow-molded article at three positions, i.e. near both end portions and middle portion in the longitudinal (extrusion) direction of the article. Each of the three specimens was measured for its average cell diameter by the method described previously according to ASTM D3576 in each of the longitudinal, peripheral and thickness directions thereof. The arithmetic mean of the measured values represents the average cell diameter of the foamed blow-molded article.

(vi) Closed Cell Content

In the measurement of the closed cell content of a foamed blow-molded article, three specimens were sampled from the blow-molded article at three positions, i.e. near both end portions and middle portion in the longitudinal (extrusion) direction of the article. Each of the three specimens was measured for its closed cell content by the method described previously according to Procedure C of ASTM D-2856-70 (reapproved 1976). The arithmetic mean of the measured values represents the closed cell content of the foamed blow-molded article.

(vii) Appearance

Each of the foamed blow-molded articles was evaluated for its appearance according to the following criteria:
Good: No surface roughness was observed on the surface of the foamed blow-molded article
Poor: Significant surface roughness was observed on the surface of the foamed blow-molded article Examples 1 to 17 and Comparative Examples 1 to 10

A molding device having two separable mold halves for forming an air duct having a maximum length of 650 mm, a maximum width of 150 mm and a maximum thickness of 70 mm was used.

Raw material PC resins (kinds and amounts are shown in Tables 4 and 5), a branching agent (amount is shown in Tables 4 and 5; the symbol "-" in Tables 4 and 5 indicates that no branching agent was added) and talc (HI-Filler #12) as a cell controlling agent were supplied to an extruder having a diameter of 65 mm and kneaded in the extruder set at a temperature of 280° C. to form a molten mixture. The amount of the branching agent shown in Tables 4 and 5 is expressed in terms of parts by mass per 100 parts by mass of the raw material PC resins. The amount of talc was 0.05 part by mass per 100 parts by mass of a total amount of the raw material PC resins and the branching agent in all of Examples and Comparative Examples except for Comparative Examples 1 and 4 in which talc was used in an amount of 0.1 part by mass per 100 parts by mass of a total amount of the raw material PC resins and the branching agent. Carbon dioxide ($CO_2$) as a blowing agent was supplied under pressure to an intermediate portion of the kneader and kneaded together with the above molten mixture to form a foamable molten resin composition. The amount of $CO_2$ was 0.34 mole per 1 kg of the molten mixture in all of Examples and Comparative Examples except for Example 2 in which $CO_2$ was used in an amount of 0.23 mole/kg. The foamable molten resin composition was cooled to a temperature suited for foaming and fed into an accumulator directly connected to the extruder and provided at its end with a circular die having a diameter of 90 mm and a lip clearance of 1.8 mm. The foamable molten resin composition was then extruded through the circular die into an ambient pressure zone and allowed to foam to form a foamed parison.

While blowing pre-blow air into the foamed parison, the foamed parison was clamped between the two mold halves disposed just beneath the die. A blow pin was then introduced into the foamed parison. Blow air was blown into the foamed parison from the blow pin, while evacuating the space between the outer surface of the foamed parison and the inner surface of the molds through vents provided in the molds, to press the outer surface of the foamed parison against the inner surface of the molds and to blow-mold the foamed parison. After cooling, the molds were opened and the blow-molded product was taken out of the molds. Protruding fins were removed from the blow-molded product to give a foamed blow-molded article.

Parison forming conditions including the discharge amount (kg/h) of the foamable molten resin composition, the discharge rate (kg/h·cm$^2$) of the foamable molten resin composition per unit area of the die lip and the surface temperature (° C.) of the foamed parison are summarized in Tables 4 and 5. The surface temperature of the foamed parison was measured before carrying out the blow molding of the foamed parison. Thus, the foamed parison, immediately after having been extruded from the die, was measured for its surface temperature at a position 100 mm below the tip of the die using an IR thermometer (Model 8700II manufactured by Sato Keiryoki Mfg. Co., Ltd.). The distance between the surface of the parison and the thermometer was 50 mm.

The obtained foamed blow-molded articles were each measured for the weight average absolute molecular weight (Mw(abs)), polystyrene-equivalent weight average molecular weight (Mw(PS), branching degree (Mw(abs)/Mw(PS)), slope S, melt viscosity, melt tension, apparent density, average thickness, thickness variation coefficient Cv, closed cell content, average cell diameter and appearance. The results are summarized in Tables 6-1, 6-2, 7-1 and 7-2.

TABLE 4

| Example | PC Resin | Branching agent (part by mass) | Branched PC/Linear PC (mass ratio) | Discharge amount (kg/h) | Discharge rate (kg/(h·cm²)) | Parison surface temperature (°C.) |
|---|---|---|---|---|---|---|
| 1 | PC1/PC5 = 70/30 | 0.9 | 70/30 | 190 | 38 | 218 |
| 2 | PC1/PC5 = 70/30 | 0.9 | 70/30 | 150 | 30 | 219 |
| 3 | PC1/PC5 = 70/30 | 1.5 | 70/30 | 150 | 30 | 219 |
| 4 | PC1/PC5 = 70/30 | 2.1 | 70/30 | 110 | 22 | 220 |
| 5 | PC1/PC5 = 70/30 | 3.0 | 70/30 | 100 | 20 | 221 |
| 6 | PC1/PC5 = 50/50 | 1.5 | 50/50 | 210 | 41 | 215 |
| 7 | PC1/PC4 = 90/10 | 1.5 | 90/10 | 160 | 32 | 223 |
| 8 | PC1/PC6 = 70/30 | 1.5 | 70/30 | 160 | 32 | 223 |
| 9 | PC1/PC5/PC12 = 14/6/80 | 1.5 | 70/30 | 130 | 26 | 221 |
| 10 | PC5/PC12 = 15/85 | 1.5 | 59.5/40.5 | 150 | 30 | 219 |
| 11 | PC1/PC5/PC12 = 10/20/70 | 1.5 | 59/41 | 140 | 28 | 220 |
| 12 | PC11 = 100 | 0.9 | 70/30 | 210 | 41 | 213 |
| 13 | PC1/PC5/PC11 = 14/6/80 | 0.9 | 70/30 | 200 | 40 | 215 |
| 14 | PC11/PC5 = 70/30 | 0.9 | 49/51 | 210 | 41 | 210 |
| 15 | PC21/PC5 = 70/30 | — | 70/30 | 140 | 28 | 219 |
| 16 | PC22/PC5 = 70/30 | — | 70/30 | 130 | 26 | 220 |
| 17 | PC22/PC5 = 50/50 | — | 50/50 | 170 | 34 | 218 |

TABLE 5

| Comparative Example | PC Resin | Branching agent (part by mass) | Branched PC/Linear PC (mass ratio) | Discharge amount (kg/h) | Discharge rate (kg/(h·cm²)) | Parison surface temperature (°C.) |
|---|---|---|---|---|---|---|
| 1 | PC1 = 100 | — | 100/0 | 130 | 26 | 230 |
| 2 | PC1/PC5 = 70/30 | — | 70/30 | 160 | 32 | 218 |
| 3 | PC1 = 100 | 0.9 | 100/0 | 90 | 18 | 233 |
| 4 | PC5 = 100 | 1.5 | 0/100 | 250 | 49 | 214 |
| 5 | PC7 = 100 | 1.5 | 0/100 | 140 | 28 | 225 |
| 6 | PC1/PC5 = 20/80 | 1.5 | 20/80 | 220 | 43 | 216 |
| 7 | PC1/PC5 = 20/80 | 3.0 | 20/80 | 200 | 40 | 217 |
| 8 | PC2/PC5 = 70/30 | 1.5 | 70/30 | 150 | 30 | 219 |
| 9 | PC1/PC7 = 70/30 | 1.5 | 70/30 | 120 | 24 | 230 |
| 10 | PC11/PC5 = 20/80 | 0.9 | 14/86 | 230 | 45 | 215 |

TABLE 6-1

| Example | Mw(abs) × 10⁴ | Mw(PS) × 10⁴ | Mw(abs)/Mw(PS) | Slope S | Melt viscosity (Pa·s) | Melt tension (cN) |
|---|---|---|---|---|---|---|
| 1 | 15 | 6.5 | 2.4 | 0.44 | 2400 | 18 |
| 2 | 15 | 6.5 | 2.4 | 0.44 | 2400 | 18 |
| 3 | 15 | 6.7 | 2.3 | 0.41 | 3100 | 25 |
| 4 | 13 | 7.1 | 1.8 | 0.34 | 3800 | 30 |
| 5 | 12 | 8.2 | 1.5 | 0.33 | 6100 | 40 |
| 6 | 17 | 6.1 | 2.8 | 0.48 | 2400 | 17 |
| 7 | 15 | 6.5 | 2.2 | 0.35 | 2700 | 25 |
| 8 | 15 | 5.4 | 2.9 | 0.34 | 3300 | 26 |
| 9 | 13 | 7.2 | 1.8 | 0.34 | 3400 | 35 |
| 10 | 14 | 7.0 | 1.9 | 0.38 | 3300 | 21 |
| 11 | 14 | 6.7 | 2.0 | 0.38 | 3300 | 23 |
| 12 | 12 | 6.7 | 1.8 | 0.35 | 2200 | 30 |
| 13 | 16 | 7.0 | 2.3 | 0.36 | 2300 | 27 |
| 14 | 13 | 6.5 | 2.0 | 0.39 | 2000 | 25 |
| 15 | 12 | 8.3 | 1.4 | 0.40 | 3200 | 31 |
| 16 | 12 | 8.5 | 1.4 | 0.39 | 3400 | 32 |
| 17 | 13 | 7.2 | 1.8 | 0.42 | 2900 | 27 |

TABLE 6-2

| Example | Apparent density (g/cm³) | Average thickness (mm) | Variation coefficient Cv (%) | Closed cell content (%) | Average cell diameter (mm) | Appearance |
|---|---|---|---|---|---|---|
| 1 | 0.29 | 3.3 | 30 | 75 | 0.5 | good |
| 2 | 0.42 | 2.1 | 25 | 70 | 0.8 | good |

TABLE 6-2-continued

| Example | Apparent density (g/cm$^3$) | Average thickness (mm) | Variation coefficient Cv (%) | Closed cell content (%) | Average cell diameter (mm) | Appearance |
|---|---|---|---|---|---|---|
| 3 | 0.20 | 4.5 | 30 | 80 | 0.8 | good |
| 4 | 0.30 | 3.3 | 30 | 85 | 0.6 | good |
| 5 | 0.26 | 5.3 | 35 | 85 | 0.8 | good |
| 6 | 0.23 | 3.3 | 40 | 75 | 0.9 | good |
| 7 | 0.21 | 3.6 | 35 | 70 | 0.3 | good |
| 8 | 0.29 | 3.2 | 35 | 65 | 0.4 | good |
| 9 | 0.20 | 4.6 | 35 | 75 | 0.5 | good |
| 10 | 0.24 | 3.5 | 30 | 70 | 0.5 | good |
| 11 | 0.21 | 4.0 | 30 | 75 | 0.5 | good |
| 12 | 0.21 | 4.1 | 30 | 90 | 0.3 | good |
| 13 | 0.21 | 4.5 | 30 | 80 | 0.4 | good |
| 14 | 0.24 | 3.7 | 30 | 80 | 0.6 | good |
| 15 | 0.22 | 4.0 | 30 | 80 | 0.5 | good |
| 16 | 0.21 | 4.5 | 35 | 80 | 0.5 | good |
| 17 | 0.24 | 3.8 | 40 | 75 | 0.5 | good |

TABLE 7-1

| Comparative Example | Mw(abs) × 10$^4$ | Mw(PS) × 10$^4$ | Mw(abs)/ Mw(PS) | Slope S | Melt viscosity (Pa·s) | Melt tension (cN) |
|---|---|---|---|---|---|---|
| 1 | 4.0 | 5.8 | 0.69 | 0.56 | 2400 | 13 |
| 2 | 3.4 | 5.1 | 0.67 | 0.59 | 2200 | 7 |
| 3 | 12 | 7.3 | 1.6 | 0.36 | 3000 | 25 |
| 4 | 2.1 | 3.8 | 0.55 | 0.67 | 1200 | 2 |
| 5 | 3.5 | 5.5 | 0.64 | 0.66 | 2300 | 3 |
| 6 | 3.5 | 4.0 | 0.88 | 0.60 | 1700 | 7 |
| 7 | 3.6 | 4.1 | 0.88 | 0.61 | 1800 | 9 |
| 8 | 2.6 | 5.6 | 0.46 | 0.63 | 2100 | 9 |
| 9 | 13 | 7.4 | 1.8 | 0.40 | 3400 | 23 |
| 10 | 6.5 | 3.8 | 1.7 | 0.57 | 1400 | 10 |

TABLE 7-2

| Comparative Example | Apparent density (g/cm$^3$) | Average thickness (mm) | Variation coefficient Cv (%) | Closed cell content (%) | Average cell diameter (mm) | Appearance |
|---|---|---|---|---|---|---|
| 1 | 0.48 | 2.5 | 60 | 15 | 0.5 | poor |
| 2 | 0.42 | 2.1 | 60 | 0 | 0.9 | poor |
| 3 | 0.34 | 3.1 | 55 | 50 | 0.7 | poor |
| 4 | 0.60 | 2.0 | 70 | 0 | 1.0 | poor |
| 5 | 0.44 | 2.7 | 65 | 30 | 0.9 | poor |
| 6 | 0.34 | 2.3 | 65 | 50 | 0.9 | poor |
| 7 | 0.33 | 2.2 | 65 | 55 | 1.0 | poor |
| 8 | 0.50 | 2.3 | 55 | 10 | 1.0 | poor |
| 9 | 0.48 | 2.4 | 55 | 25 | 0.5 | poor |
| 10 | 0.33 | 2.5 | 65 | 50 | 0.9 | poor |

The foamed blow-molded article obtained by the process of the present invention has excellent heat insulating property, heat resistance and mechanical strengths and, therefore, may be advantageously used for various applications such as automobile parts, electric or electronic parts, packaging materials and receptacles.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A process for producing a polycarbonate resin foamed blow-molded article, comprising the steps of:
    (a) melting and mixing a branched polycarbonate resin "B", a linear polycarbonate resin "C" and a branching agent "D" to obtain a polycarbonate resin "A" in a molten state,
    wherein the branched polycarbonate resin "B" has a polystyrene equivalent weight average molecular weight $Mw_B(PS)$ of $5.5 \times 10^4$ to $7.0 \times 10^4$, a weight average absolute molecular weight $Mw_B(abs)$ providing a ratio $Mw_B(abs)/Mw_B(PS)$ of the weight average absolute molecular weight $Mw_B(abs)$ to the weight average molecular weight $Mw_B(PS)$ of 0.63 to 0.70 and a content of terminal hydroxyl groups of 500 ppm by mass or more, and the linear polycarbonate resin "C" has a polystyrene equivalent weight average molecular weight $Mw_C(PS)$ of less than $5.0 \times 10^4$, a weight average absolute molecular weight $Mw_C(abs)$ providing a ratio $Mw_C(abs)/Mw_C(PS)$ of the weight average absolute molecular weight $Mw_C(abs)$ to the weight average molecular weight $Mw_C(PS)$ of 0.62 or less and a content of terminal hydroxyl groups of 250 ppm by mass or less, and wherein the branched polycarbonate resin "B" and the linear polycarbonate resin "C" are used in such a proportion as to provide a mass ratio B:C of the branched polycarbonate resin "B" to the linear polycarbonate resin "C" of 30:70 to 95:5, (b) mixing the polycarbonate resin "A" in a molten state with a blowing agent to obtain a foamable molten resin composition, (c) extruding the foamable molten resin composition to obtain a foamed parison, and (d) blow-molding the foamed parison to obtain a foamed blow-molded article.

2. The process according to claim 1, wherein the foamed parison has a polystyrene equivalent weight average molecular weight $Mw_F(PS)$ of $5.0 \times 10^4$ to $10 \times 10^4$, and a weight average absolute molecular weight $Mw_F(abs)$ providing a ratio $Mw_F(abs)/Mw_F(PS)$ of the weight average absolute molecular weight $Mw_F(abs)$ to the weight average molecular weight $Mw_F(PS)$ of 1.0 or more.

3. The process according to claim 1, wherein the branching agent D is an epoxy-functional acrylic polymer that has a weight average molecular weight of 5,000 to 20,000 and an epoxy value of 1.5 meq/g or more.

4. The process according to claim 3, wherein, in step (a), the branching agent D is used in an amount of 0.5 to 4.5 parts by mass per 100 parts by mass of the branched polycarbonate resin "B".

5. The process according to claim 1, wherein the blowing agent is an inorganic physical blowing agent.

* * * * *